Oct. 2, 1934.  W. LA HODNY  1,975,158
COMBINED REAR VISION MIRROR AND CLOCK
Filed Nov. 17, 1930  4 Sheets-Sheet 1
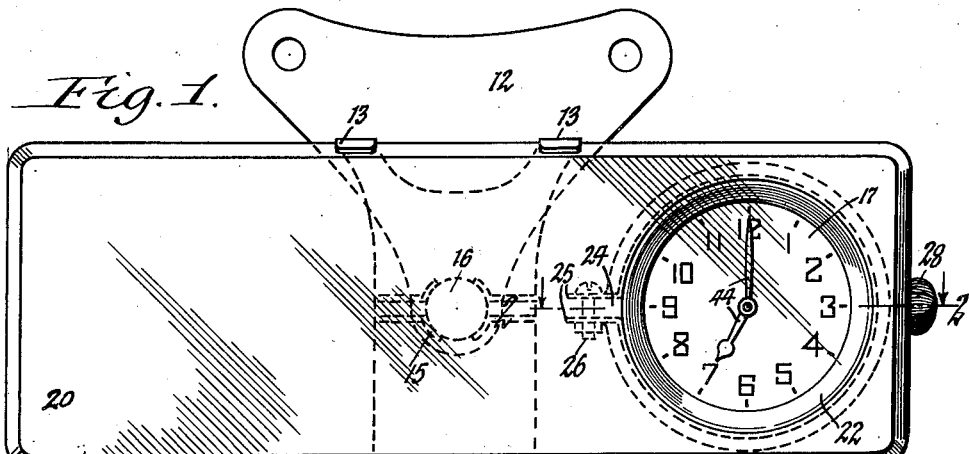
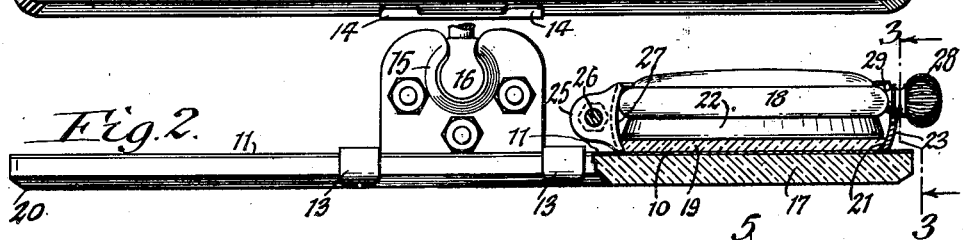
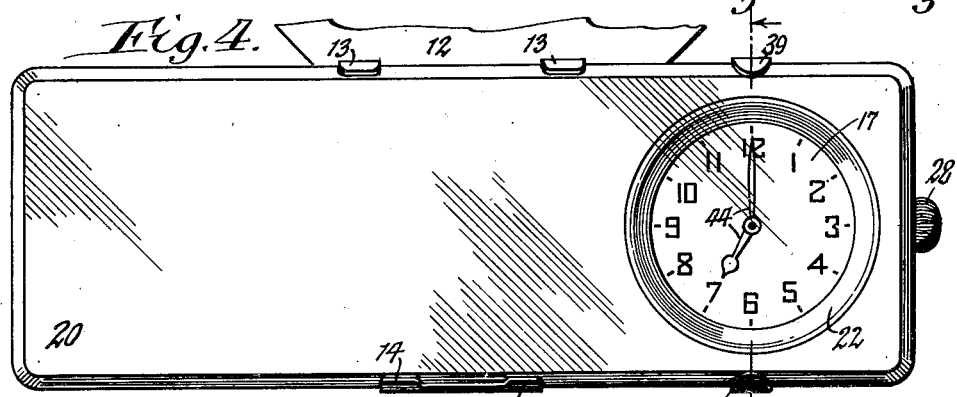
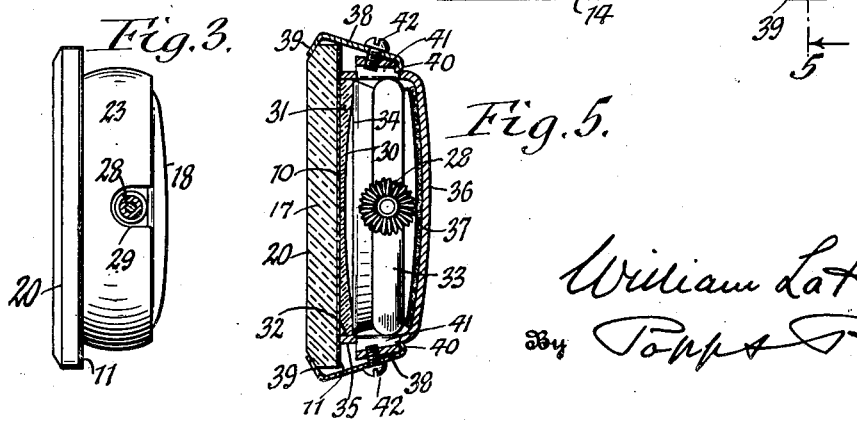

Oct. 2, 1934. W. LA HODNY 1,975,158
COMBINED REAR VISION MIRROR AND CLOCK
Filed Nov. 17, 1930 4 Sheets-Sheet 2
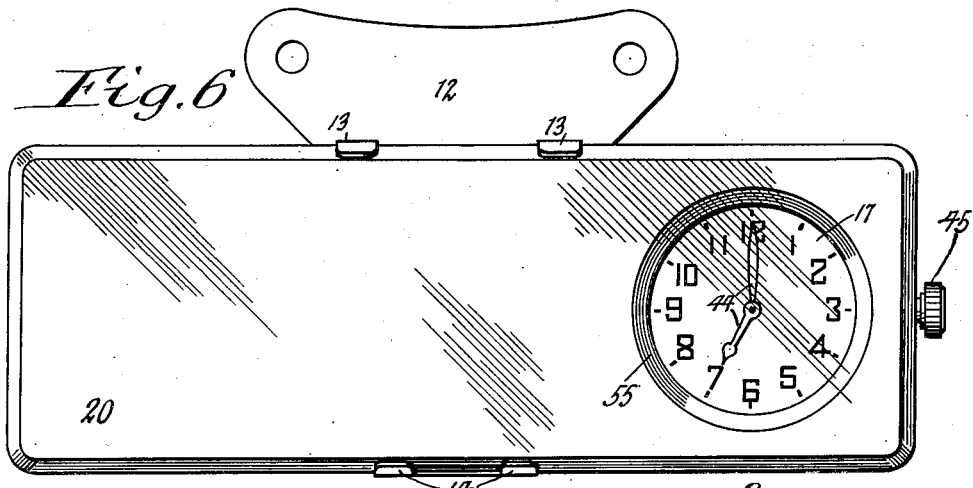
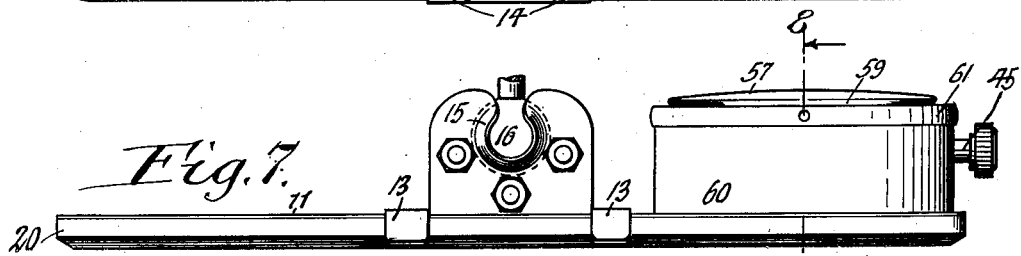
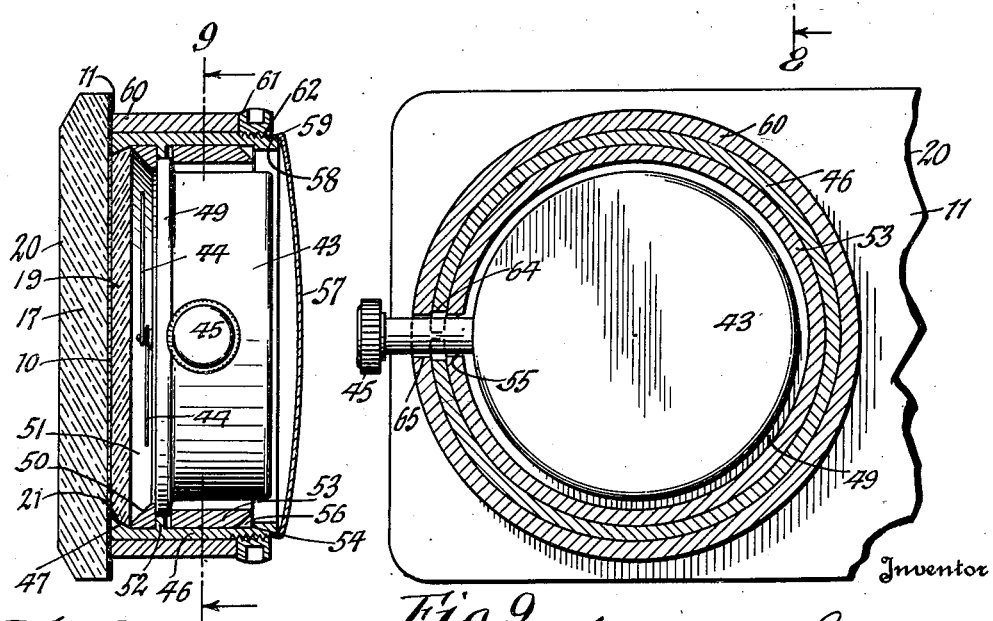

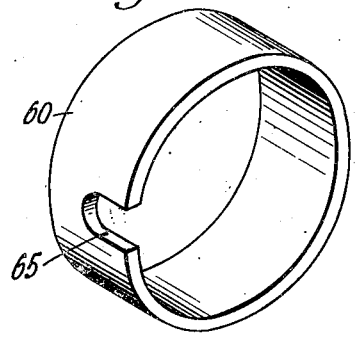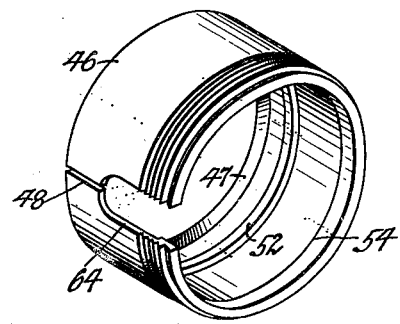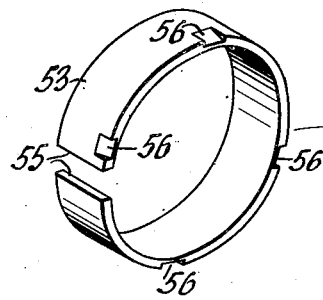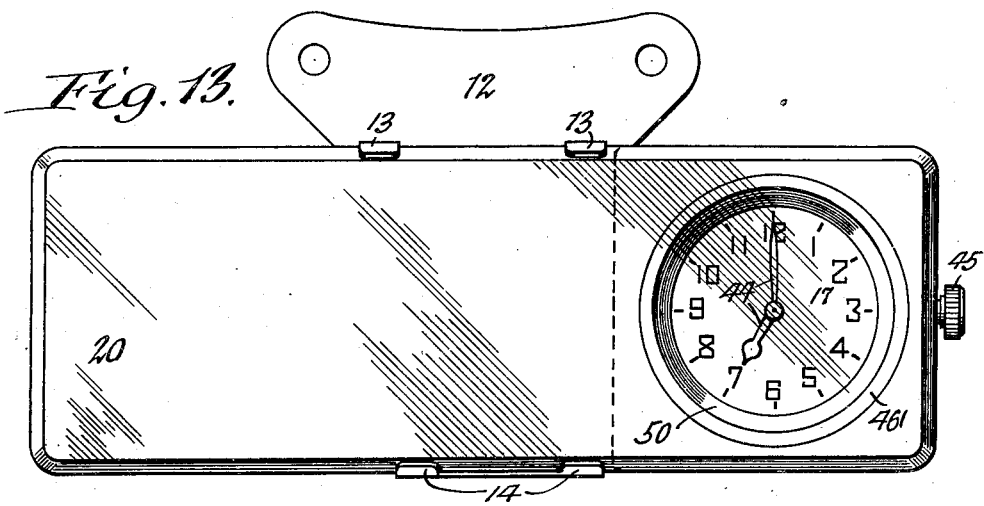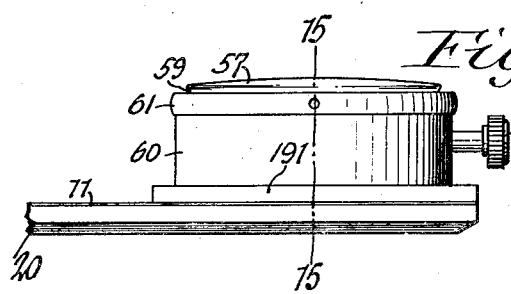

Oct. 2, 1934.  W. LA HODNY  1,975,158
COMBINED REAR VISION MIRROR AND CLOCK
Filed Nov. 17, 1930   4 Sheets-Sheet 4
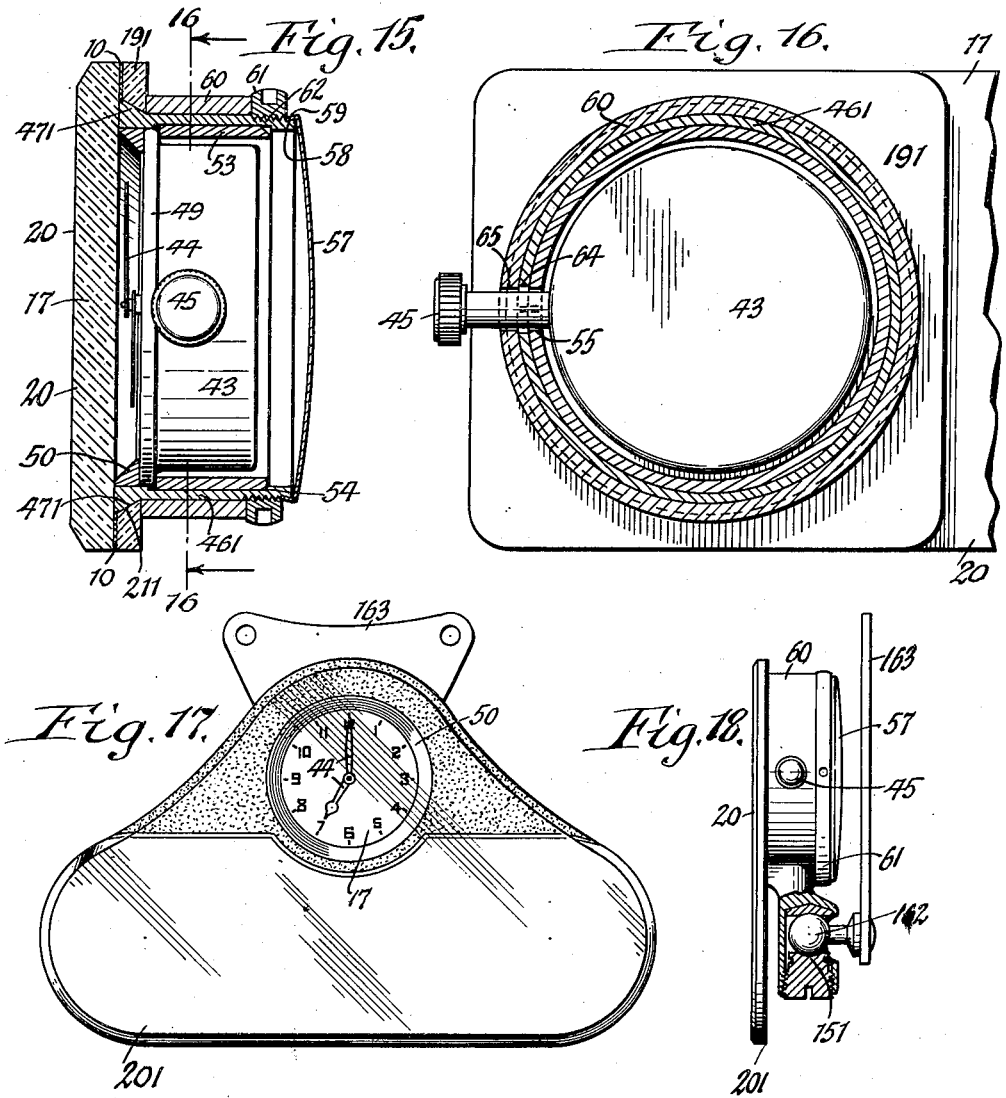

Patented Oct. 2, 1934

1,975,158

UNITED STATES PATENT OFFICE 1,975,158

COMBINED REAR VISION MIRROR AND CLOCK

William La Hodny, Buffalo, N. Y., assignor to Standard Mirror Company Inc., Buffalo, N. Y., a corporation of New York Application November 17, 1930, Serial No. 496,121

30 Claims. (Cl. 45—97)

This invention relates to a combined mirror and instrument and although this invention is more particularly intended for combining a rear view mirror with a time piece, such as a watch or clock, it is equally useful in combining a mirror with a barometer, thermostat, compass, oil gage, viscosity gage, or other instrument usually employed on automobiles and similar installations.

It is the object of this invention to provide a combined mirror and instrument of this character which permits of fastening together these devices by means which are strong and durable in construction, reliable and efficient in operation, and capable of being produced economically.

In the accompanying drawings:

Figure 1 is a front elevation of a rear view mirror of oblong rectangular form combined with a watch by means of one form of my invention.

Figure 2 is a top view of the same, partly in section, the sectional part being taken on line 2—2, Fig. 1.

Figure 3 is an end view, partly in section, of the construction shown in Figs. 1 and 2.

Figure 4 is a front view of a rear view mirror in which a watch is fastened thereto by a modified form of fastening in accordance with my invention.

Figure 5 is a vertical cross section of the same taken on line 5—5, Fig. 4.

Figure 6 is a front view of a rear view mirror showing still another form of my improved means for fastening a watch to the same.

Figure 7 is a top view of the construction shown in Fig. 6.

Figure 8 is a vertical cross section taken on line 8—8, Fig. 7.

Figure 9 is a vertical longitudinal section taken on line 9—9, Fig. 8.

Figure 10 is a perspective view of the cylindrical wall of the watch casing used in the construction shown in Figs. 6-9.

Figure 11 is a similar view of the clamping ring used in the construction shown in Figs. 6-9.

Figure 12 is a similar view of the spacing ring used in the construction shown in Figs. 6-9.

Figure 13 is a front view of still another form of combined mirror and watch embodying my invention.

Figure 14 is a fragmentary top view of the same.

Figure 15 is a vertical cross section of the same, on an enlarged scale, taken on line 15—15, Fig. 14.

Figure 16 is a vertical longitudinal section taken on line 16—16, Fig. 15.

Figure 17 is a front view of a combined mirror and watch containing my invention but showing a different form of supporting bracket from that shown in Figs. 1, 2, 4 and 13.

Figure 18 is an end elevation of the same, partly in section.

In the following description similar characters of reference indicate like parts in the several figures of the drawings.

Although the accompanying drawings show this invention in connection with a watch or clock it is to be understood that any other time piece, or any other kind of instrument such as a thermometer, compass, oil gage, viscosity gage, barometer and so forth may be used instead and it is therefore to be understood that in the following description reference to a watch or clock is merely for convenience and that this term is intended to include any kind of instrument which may be used in connection with a mirror.

Referring to the construction shown in Figs. 1, 2 and 3, the numeral 20 represents a clear glass plate which in this instance is made of oblong rectangular form and provided on its rear side with a reflecting coating 11, such as quick silver, for the purpose of converting this glass plate into a mirror which is adapted to be used for rear vision purposes on automobiles and the like.

This mirror may be mounted upon the windshield of an automobile or other available support by means of a bracket which in the present case comprises upper and lower hooks or jaws 13, 14 engaging with the upper and lower edges of the glass plate adjacent to the center thereof and having their opposing inner ends constructed to form a socket 15, and a hanger 12 adapted to be secured to the frame of the windshield and provided at its lower end with a ball 16 which is frictionally held in the socket 15, as shown in Figs. 1 and 2.

Adjacent to one end of the mirror the reflecting coating is omitted or removed so as to form an area 17 on this glass plate which is transparent, this area in the present case being of circular form. In rear of this transparent area of the mirror plate is arranged an instrument of any suitable character which is adapted to be observed by the driver or other persons in the car, such for example as a circular time-piece 18 which may be either constructed in the form of a watch or small clock and mounted on the mirror plate in rear of the transparent area thereof so that the face of the clock is visible by the driver or other persons from the front side of the mirror and thereby enable the time of day to be ascertained whenever desired.

The present invention relates primarily to the means of mounting this clock on the mirror plate and the form of this invention, as shown in Figs. 1, 2 and 3 is constructed as follows:

The numeral 19 represents an attaching plate made of any suitable transparent material such for example as glass, celluloid and the like, and this attaching plate may also be of any desired contour to suit the instrument with which the same is intended to cooperate but in the present case is of circular form and of a diameter equal to the circular transparent area of the mirror plate. This attaching plate may be secured to the mirror plate in rear of the transparent area thereof in any suitable manner, but this is preferably accomplished by means of a film 10 of transparent cement which is applied to the rear side of the transparent area of the mirror plate and the front side of the transparent attaching plate so as to securely unite the same and still permit of observing the front side of the clock which is arranged in rear of this transparent area.

In the construction shown in Fig. 2, the attaching plate has its outer or peripheral edge bevelled forwardly, as shown at 21, so that this edge is undercut relative to the rear side of this attaching plate and forms an annular outwardly opening groove between the edge of the attaching plate and the adjacent rear side of the mirror plate. The clock or time piece is held with the marginal part of the bezel 22 on its front side in engagement with the rear side of the attaching plate 19 by means of a clamping ring 23 which surrounds the periphery of the attaching plate and the clock case, and is secured to these members by splitting this clamping ring at one point, as shown at 24, and connecting two ears or lugs 25 at the ends of the split parts of this ring by means of a clamping bolt 26. In order to prevent this clamping ring from slipping off the attaching plate 19 and also to prevent the clock from slipping out of the rear side of this ring, the latter is curved transversely so as to form a concave transverse clamping face 27 on its inner side whereby the front edge of this clamping ring forms a rearwardly facing internal shoulder which engages with the forwardly facing undercut shoulder 21 on the attaching plate, and the rear edge of the clamping ring forms a forwardly facing internal shoulder which engages with the marginal part of the rear side of the clock case and holds the same in an assembled position relative to the attaching plate and the mirror plate.

The operating stem 28 of the time piece is preferably so arranged that the same projects from the time piece horizontally and laterally therefrom a sufficient distance beyond the right hand edge of the mirror plate, so that the same will be conveniently accessible for winding and setting the clock or watch. In order to permit this operating stem 28 to assume this position and still permit the clock to be engaged by the clamping ring 23 for holding the same in place, the split part of this clamping ring is arranged on the inner part of the same and the diametrically opposite part of this ring which is arranged adjacent to the right hand edge of the mirror plate is provided with a notch 29 which receives the neck of the winding stem 28, as shown in Figs. 2 and 3.

The means for thus mounting the time piece or other instrument on the mirror plate are wholly independent and in no wise connected with the bracket which supports the mirror plate on a windshield or the like, excepting that the clock mounting and the mirror mounting are connected with the same mirror plate, but otherwise there is no direct physical connection between the instrument mounting and the mirror mounting, and these mountings perform their functions wholly independently of each other so that adjustment, inspection and repairs of one can be effected without disturbing the other.

By making the attaching plate of a material separate from the mirror plate a laminated transparent structure is provided for the transparent area through which the face of the clock or other instrument is visible which gives the impression of bringing the face of the clock, watch or other instrument nearer to the front surface of the mirror plate than would otherwise be the case. This is due to the fact that four reflecting surfaces are provided by the mirror plate and the attaching plate, viz: the front and rear sides of the mirror plate and the front and rear sides of the attaching plate through which the face of the instrument is visible from the front of the mirror plate.

This effect of making the face of the watch, clock or other instrument appear to be closer to the front side of the mirror plate is further enhanced by constructing the rear side of the transparent attaching plate of convex form, as shown for example on the rear side 30 of the attaching plate 31, shown in Fig. 5, which concave face produces the additional effect of an ordinary dished glass crystal usually placed over the front side of a watch or clock.

In the modified form of this invention shown in Figs. 4 and 5 the transparent attaching plate 31 has its margin or edge provided with a cylindrical face 32 and the time piece 33 is held with its bezel 34 on the marginal part of its front side against the marginal part of the rear side of the transparent attaching plate 31 by means of a cup-shaped casing, the annular wall 35 of which surrounds the periphery 32 of the attaching plate 31 and the periphery of the watch or instrument 33, this wall 35 being provided with a rear head 36 which bears against the rear side of the watch or clock through the medium of an interposed elastic packing 37 which is made of felt or similar material. This casing is detachably connected with the mirror plate by means of upper and lower clips 38, 38, each of which is provided at its front end with a claw, jaw or hook 39 and engaging over the corresponding horizontal edge of the respective mirror plate, and a rear jaw, claw or hook 40 engaging with a shoulder formed on the rear side of a lip 41 pressed outwardly from the adjacent part of the wall 35 of the clock casing, and means for holding these clips in place consisting preferably of screws 42 each of which passes through an opening in one of the clips and engages its threaded inner end with a threaded opening in the respective lip 41, while the head at its outer end bears against the outer side of the respective clip, as shown in Fig. 5.

In the embodiment of my invention, as shown in Figs. 6, 7, 8, 9, 10, 11 and 12 the means for mounting an instrument on a mirror plate 20 having an attaching plate 19 similar to that shown in Fig. 2 is constructed as follows:

In these figures the form of my invention employed for mounting a clock or watch in rear of the transparent area of the mirror plate and the attaching plate is more particularly intended for use in connection with a clock which is provided with a cylindrical housing 43 having an annular bead 49 at its front end and a laterally projecting winding and setting stem 45, which latter for convenience will be referred to as an operating stem.

In this modified form of my invention an annular clamping ring 46 is employed which surrounds the edge of the attaching plate 19 and the periphery of the clock or time piece, and is provided at its front edge with an internal beveled coupling rim 47 which forms a rearwardly facing shoulder engaging the forwardly facing undercut edge 21 of the attaching plate, as shown in Fig. 8 and thereby prevents the clamping ring which forms part of the housing or casing for the clock or other instrument from being pulled rearwardly away from the attaching plate and mirror plate. In order to permit this clamping ring to thus engage the attaching plate, this ring is split at one point in its periphery, preferably the right hand side thereof, as shown at 48 in Figs. 9 and 11, thereby permitting this clamping ring to be sprung apart sufficiently to engage its front rim 47 with the undercut edge of the attaching plate and also to again contract for establishing a connection between this ring and the attaching plate.

The casing 43 of the clock or watch is held with its face a sufficient distance in rear of the attaching plate so as to provide an intervening space 51 therebetween in which the clock hands 44 are free to rotate, this space being formed by employing an annular bezel 50 which engages its periphery with the inside of the clamping ring 46 and bears with its front side against the attaching plate and with its rear side against an inwardly projecting flange 52 arranged on the inner side of the clamping ring 46 so that the front side of this flange 52 is transversely in line with the front side of the clock casing and is engaged simultaneously therewith by the rear side of the bezel 50, as shown in Fig. 8. This bezel is introduced into the clamping ring by springing the latter open sufficiently for this purpose.

The clock casing 43 is held with the front side of its bead 49 in engagement with the bezel 50 by means of a spacing ring 53 which engages with the rear part of the inner side of the clamping ring 46 and bears with its front end against the rear side of the bead 49 on the clock case, while its rear end bears against an internal forwardly facing shoulder 54 formed on the rear part of the inner side of the clamping ring, as shown in Fig. 8. In order to permit the spacing ring 53 to be thus engaged with the clamping ring 46 and the clock case and also removed therefrom, this spacing ring is split at one point of its circumference, as shown at 55, in Figs. 9 and 12, thereby permitting this spacing ring to be sprung the requisite extent for this purpose in assembling and dismembering these parts.

In order to permit of conveniently contracting the spacing ring when it is desired to remove the same from the clock and clamping ring, the rear part of this locking ring is provided at one or more points in its periphery with a notch 56 which is adapted to receive the edge of a screw driver or other instrument for prying this spacing ring out of the clamping ring whenever it is desired to dismantle the parts.

The rear end of the clamping ring is preferably closed by a snap head 57 which is constructed of spring sheet metal and is of dished form and detachably connected with an annular under cut seat 58 on the exterior of the rear end of the clamping ring by engagement of an annular rim 59 on the edge of this head with this seat, as shown in Fig. 8.

The clamping ring is held in its contracted position, so that the coupling rim 47 at its front end engages firmly with the undercut face 21 of the attaching plate and the flange 52 of the clamping ring is held tightly in engagement with the bead 49 of the clock casing, by means of a continuous annular band or casing ring 60 which surrounds the front part of the clamping ring when the latter is in its contracted condition and is held tightly with its front side or end against the back of the mirror plate by means of a locking ring 61 having a screw connection 62 with the exterior of the clamping ring at the rear end thereof and bearing against the rear end of the casing ring, as shown in Fig. 9.

When the several parts of the clock and rear view mirror are assembled in the manner shown in Fig. 8 the clock is supported reliably on the mirror plate so that none of the parts can become loose while this device is mounted on an automobile and subjected to the jarring action of the same.

For the purpose of winding and setting the time piece enclosed in the casing 43 in the construction shown in Figs. 6 to 9 the works of the watch are provided with a laterally projecting winding and setting stem 45 which is adapted to project through the slit 55 between the ends of the split spacing ring, an enlargement or notch 64 at the front end of the slit 48 in the clamping ring, and a notch 65 in the rear edge of the retaining or casing ring 60, thereby enabling these parts to be assembled and dismembered without interfering with each other and still permitting the watch or clock to be wound and set from the exterior of the time piece and its mounting whenever this is required.

In the form of my invention shown in Figs. 12, 14, 15 and 16 the attaching plate 191 is made in the form of a frame instead of a disk, as shown in Fig. 9, and the inner edge of this frame shaped attaching plate is provided with an undercut edge 211 of bevelled or angular form which is engaged by a correspondingly bevelled rim 471 arranged on the front end of the clamping ring 461. In this case the clamping ring is also split in the manner similar to the clamping ring shown in Fig. 11, but the same is contracted for the purpose of disengaging the coupling rim 471 from the undercut seat 211 and this clamping ring is expanded for engaging the coupling rim 471 with the respective undercut edge 211 of the attaching plate 191.

In this modified form the annular bezel 50 is interposed between the rear side of the mirror plate 20 and the front side of the bead 49 on the clock case, and the spacing ring 53 is arranged within the clamping ring and bears at its front end against the rear side of the bead 49 while its rear end bears against an internal forwardly facing shoulder 54 on the clamping ring. In other respects these means for holding the clock on the mirror plate are substantially like those shown in the construction illustrated in Figs. 6 to 12.

It is to be understood that this invention is applicable to mirror plates of various forms and not limited to the oblong rectangular form shown in Figs. 1, 4, 6 and 13. For example, the mirror may be of substantially triangular form with rounded corners, as shown at 201 in Fig. 7.

If desired the features of this invention may be embodied in a mirror and clock mounting device in which the means for attaching the clock to the mirror plate are connected directly with the bracket which is adapted to support the clock and mirror on a windshield or other support, but is not connected independently with the mirror plate. Such an example is shown in Fig. 18 in which the lower side of the casing ring 60 is provided with a ball socket 151 which receives a ball 162 arranged at the lower end of a hanger 163 adapted to be secured to the windshield of an automobile or other support.

In the manufacture of this combined mirror and clock any suitable cement may be used for connecting the laminations consisting of the mirror plate and the attaching plate. The reflecting coating to the mirror plate may be applied thereto either before or after the attaching plate is connected therewith.

Although the attaching plate is shown in the several examples as consisting either of a circular disk or a frame having a circular opening, the external edge of the disk or the internal edge of the frame shaped attaching plate may be of any other desired form, for example hexagonal, octagonal or square with rounded corners.

When it is desired to take out the clock or watch from the mounting this can be done by springing off the snap cover or head 57 at the rear end of the clamping ring and then springing the spacing or retaining ring 53 sufficiently to disengage the same from the clock case and clamping ring after which the clock, watch or other instrument may be removed for inspection or repairs, and all the parts may be again replaced in the reverse order just described, without disturbing the other parts whereby the clock is mounted on the mirror plate.

If desired the attaching plate may be made of various colors, materials or designs in order to add a decorative effect to the combined rear vision mirror and instrument holder as a whole.

I claim as my invention:

1. An article of the character described comprising a transparent panel, a transparent attaching plate secured to the rear side of said panel, an instrument arranged in rear of said transparent plate, and means for holding said instrument in place relative to said panel and transparent plate.

2. An article of the character described, comprising a transparent panel, an attaching plate secured to the rear side of said panel, and having an undercut edge, an instrument arranged in rear of said panel, and means for holding said instrument in position relative to said panel including an element engaging with the undercut edge of said attaching plate.

3. An article of the character described, comprising a transparent panel, a transparent attaching plate secured to the rear side of said panel and provided with an undercut edge, an instrument arranged in rear of said attaching plate, and means for holding said instrument in position relative to said attaching plate including an element engaging with the undercut edge of said attaching plate.

4. An article of the character described, comprising a transparent panel, a transparent attaching plate secured to the rear side of said panel and provided with an undercut edge, an instrument arranged in rear of said attaching plate, and means for holding said instrument in position relative to said attaching plate including a clamping ring provided at its front end with an internal rim engaging the undercut edge of said attaching plate.

5. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate.

6. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, said instrument having an external annular bead and said clamping ring having an internal forwardly facing shoulder at its rear end, a bezel arranged within the front part of said clamping ring between said internal rim thereof and the bead of said instrument, and a spacing ring arranged within the rear part of said clamping ring between the rear internal shoulder thereof and the rear side of the bead on said instrument.

7. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, said instrument having an external annular bead and said clamping ring having an internal forwardly facing shoulder at its rear end, a bezel arranged within the front part of said clamping ring between said internal rim thereof and the bead of said instrument, and a split spacing ring arranged within said clamping ring between said rear shoulder thereof and the rear side of said bead.

8. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, said instrument having an external annular bead and said clamping ring having an internal forwardly facing shoulder at its rear end, a bezel arranged within the front part of said clamping ring between said internal rim thereof and the bead of said instrument, and a split spacing ring arranged within said clamping ring between said rear shoulder thereof and the rear side of said bead, and having a notch in its edge for the reception of a tool to remove the spacing ring from the clamping ring.

9. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, said instrument having an external bead and said clamping ring being provided between its ends with an internal flange which has its front side in line with the front side of said bead and also has an internal forwardly projecting shoulder at its rear end, a bezel arranged within the front part of said clamping ring between said rim and the front sides of said flange and bead, and a spacing ring arranged within the rear part of said clamping ring between the forwardly facing rear shoulder thereof and the rear side of said bead of the instrument.

10. An article of the character described, comprising a transparent panel, a transparent attaching plate secured to the rear side of said panel and provided with an undercut edge, an instrument arranged in rear of said attaching plate, and means for holding said instrument in position relative to said attaching plate including a clamping ring provided at its front end with an internal rim engaging the undercut edge of said attaching plate, and a head detachably connected with the rear end of said clamping ring.

11. An article of the character described, comprising a transparent panel, a transparent attaching plate secured to the rear side of said panel and provided with an undercut edge, an instrument arranged in rear of said attaching plate, and means for holding said instrument in position relative to said attaching plate including a clamping ring provided at its front end with an internal rim engaging the undercut edge of said attaching plate, and a head of spring material having an internal rim adapted to engage over an external rim on the rear end of said clamping ring.

12. An article of the character described, comprising a transparent panel, a transparent attaching plate secured to the rear side of said panel and provided with an undercut edge, an instrument arranged in rear of said attaching plate, and means for holding said instrument in position relative to said attaching plate including a clamping ring provided at its front end with an internal rim engaging the undercut edge of said attaching plate and provided at its rear edge with a notch for the reception of a stem on said instrument.

13. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, and a casing ring surrounding said clamping ring.

14. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, a casing ring surrounding said clamping ring, and a locking ring arranged on the rear end of said clamping ring and engaging the rear end of said casing ring.

15. An article of the character described, comprising a transparent panel, a transparent attaching plate secured to the rear side of said panel and provided with an undercut edge, an instrument arranged in rear of said attaching plate, and means for holding said instrument in position relative to said attaching plate including a split clamping ring surrounding said instrument and provided at its front end with an internal rim engaging the undercut edge of said attaching plate, a casing ring surrounding said clamping ring and engaging the rear side of said panel, and a locking ring having a screw connection with the rear end of said clamping ring and engaging with the rear end of said casing ring.

16. An article of the character described, comprising a transparent panel, an attaching plate secured to the rear side of said panel and having an undercut edge, an instrument arranged in rear of said panel and means for holding said instrument in place including a split clamping ring surrounding said instrument and having a rim at its front end which engages said undercut edge, and a casing ring surrounding said clamping ring.

17. An article of the character described comprising a transparent panel, an attaching plate secured to the rear side of said panel and having an internal undercut edge, an instrument arranged in rear of said panel, and means for holding said instrument in place including an attaching ring surrounding said instrument and provided at its front end with an external rim engaging with the internal undercut edge of said attaching plate.

18. An article of the character described comprising a transparent panel, an attaching plate secured to the rear side of said panel and having an internal undercut edge, an instrument arranged in rear of said panel, and means for holding said instrument in place including an attaching ring surrounding said instrument and provided at its front end with an external rim engaging with the internal undercut edge of said attaching plate, and a casing ring surrounding said clamping ring and engaging its front end with the rear side of said panel, and a locking ring having a screw connection with the clamping ring and engaging with the rear end of said casing ring.

19. An article of the character described, comprising a transparent panel, an attaching plate secured to the rear side of said panel and having an undercut edge, an instrument arranged in rear of said panel, and means for holding said instrument in place including a split clamping ring surrounding said instrument and having a rim at its front end which engages said undercut edge, and a casing ring surrounding said clamping ring, said casing ring and clamping ring being provided at their rear edges with notches for a stem on said instrument.

20. An instrument of the character described, comprising a transparent panel, a transparent plate arranged in rear of said panel, an instrument arranged in rear of said transparent plate, and means for holding said instrument in place including a casing member enclosing said instrument and engaging with the edge of said transparent plate.

21. An article of the character described, comprising a transparent panel, a transparent attaching plate attached to the rear of said panel and having an undercut edge, an instrument arranged in rear of said attaching plate, and means for holding said instrument in place including a split retaining ring surrounding said instrument and engaging said undercut edge, and a screw connecting the ends of said split ring.

22. An article of the character described, comprising a transparent panel, a transparent attaching plate attached to the rear of said panel and having an undercut edge, an instrument arranged in rear of said attaching plate, and means for holding said instrument in place including a split retaining ring which has a concave inner side in cross section and engages its front end with the undercut edge of said attaching plate while its rear end overhangs the rear side of said instrument, and a screw connecting the ends of said split retaining ring.

23. Improved means for mounting a dial instrument comprising a transparent member having a cavity in one portion of a face thereof, said cavity having a maximum depth less than the thickness of said member, a dial instrument and means engaging said instrument and extending into said cavity, and anchored within said cavity directly to the wall thereof, whereby said instrument will be supported from said member solely by its anchorage within said cavity.

24. Improved means for mounting a dial instrument comprising a transparent imperforate member having a wall which extends from, and is approximately normal to the interior area of one face of said member and bounds an area of said member, a dial instrument and means secured directly to the face of said wall and engaging said instrument to confine the latter to said member, for observation through said area of said member.

25. Improved means for mounting a dial instrument comprising a transparent member having upon a part of its rear face an internal chamber opening through said rear face and closed by the front face of said member, a dial instrument disposed at the rear face of said member and visible through and covered by a portion of said member, and a member engaging said instrument and clamped to a wall of said chamber to confine said instrument to said member.

26. Improved means for mounting a dial instrument comprising a transparent member having upon a part of its rear face an internal chamber opening through said rear face and closed by the front face of said member, a dial instrument disposed at the rear face of said member and visible through and covered by the closed end of said chamber of said member, and means anchored to a wall of said chamber and removably confining said instrument to said member.

27. Improved means for mounting a dial instrument comprising an imperforate glass plate, said plate having a wall extending from an interior section of said surface, in a direction approximately normal thereto, a dial instrument, and a split shell mounting said instrument in a position to be visible through and covered by said plate, and at the split partially telescoping with, and removably clamped to, said wall by a change in diameter of the split part.

28. Improved means for mounting a dial instrument comprising a transparent plate, a dial instrument disposed at the rear of said plate in a position with its dial visible through said plate, said plate also having a shoulder on the interior area of its rear face, means confining said instrument in said position and fitted to said shoulder, and means for drawing said mounting means into tight clamping engagement with said shoulder, whereby said instrument will be confined to and supported from said plate.

29. Improved means for mounting a dial instrument comprising a transparent plate having an undercut wall on its rear face, a dial instrument disposed adjacent the rear face of said plate in a position to be visible therethrough, and means anchored to said wall by the undercut portion thereof, and confining said instrument to said plate.

30. Improved means for mounting a dial instrument comprising an imperforate, transparent plate of frangible material and having, in an interior area of one face thereof a shoulder in said face, a dial instrument disposed at said one face of said plate so as to be visible through said interior area of said plate, and means fitted and anchored to the shoulder of said plate in the interior area of its rear face for confining said instrument to said plate.

WILLIAM LA HODNY.